United States Patent
Singh et al.

[11] Patent Number: 6,110,620
[45] Date of Patent: Aug. 29, 2000

[54] CONTROLLED CRYSTALLITE SIZE ELECTRODE

[75] Inventors: Deepika B. Singh; Jon R. Young, both of Gainesville, Fla.

[73] Assignee: Eveready Battery Company, Inc., St. Louis, Mo.

[21] Appl. No.: 08/941,666

[22] Filed: Sep. 30, 1997

[51] Int. Cl.[7] .................................................. H01M 4/32
[52] U.S. Cl. ...................... 429/223; 429/218.1; 429/235
[58] Field of Search ............................. 429/223, 218.1, 429/235; 423/592; 205/705, 723

[56] References Cited

U.S. PATENT DOCUMENTS

| | | | |
|---|---|---|---|
| 5,344,728 | 9/1994 | Ovshinsky et al. | 429/223 |
| 5,637,423 | 6/1997 | Ovshinsky | 429/223 |
| 5,702,844 | 12/1997 | Bernard et al. | 429/223 |
| 5,788,943 | 8/1998 | Aladjov | 423/594 |

FOREIGN PATENT DOCUMENTS

| | | |
|---|---|---|
| 0547998 | 6/1993 | European Pat. Off. . |
| 0730315 | 9/1996 | European Pat. Off. . |
| 4349353 | 12/1992 | Japan . |
| 5041213 | 2/1993 | Japan . |
| 5290841 | 11/1993 | Japan . |

OTHER PUBLICATIONS

Bernard M. C. et al., "Structural defects and electrochemical reactivity of 62-Ni $(OH)_2$"*Journal of Power Sources*, vol. 63, No. 2, Dec. 1996, pp. 247–254.

*Primary Examiner*—Maria Nuzzolillo
*Assistant Examiner*—Angela J. Martin
*Attorney, Agent, or Firm*—Linda Gebauer

[57] ABSTRACT

This invention relates to methods for forming nickel hydroxide battery electrodes comprising nickel hydroxide particles which have crystallite sizes falling within the range of about 60 Å to about 160 Å.

34 Claims, 5 Drawing Sheets

Unit Cell of β-Ni(OH)₂

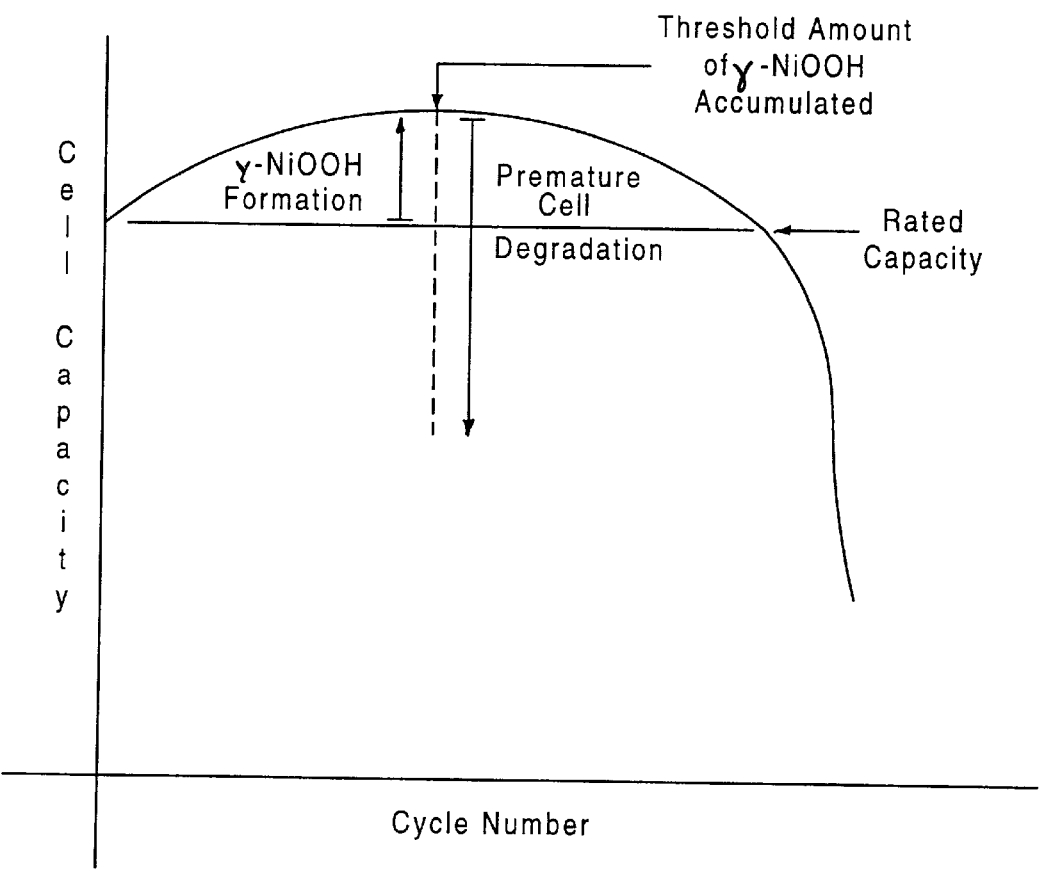

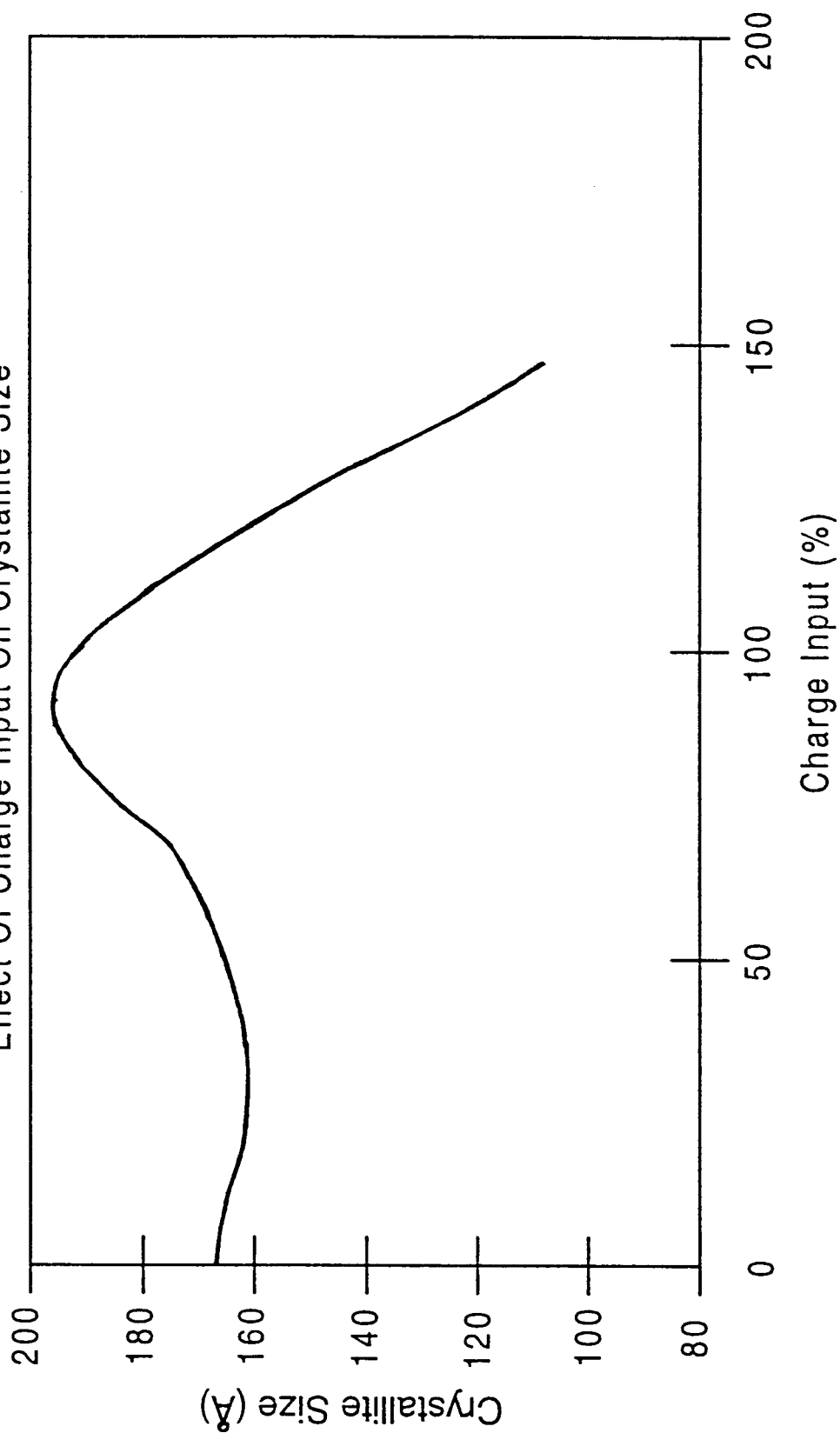

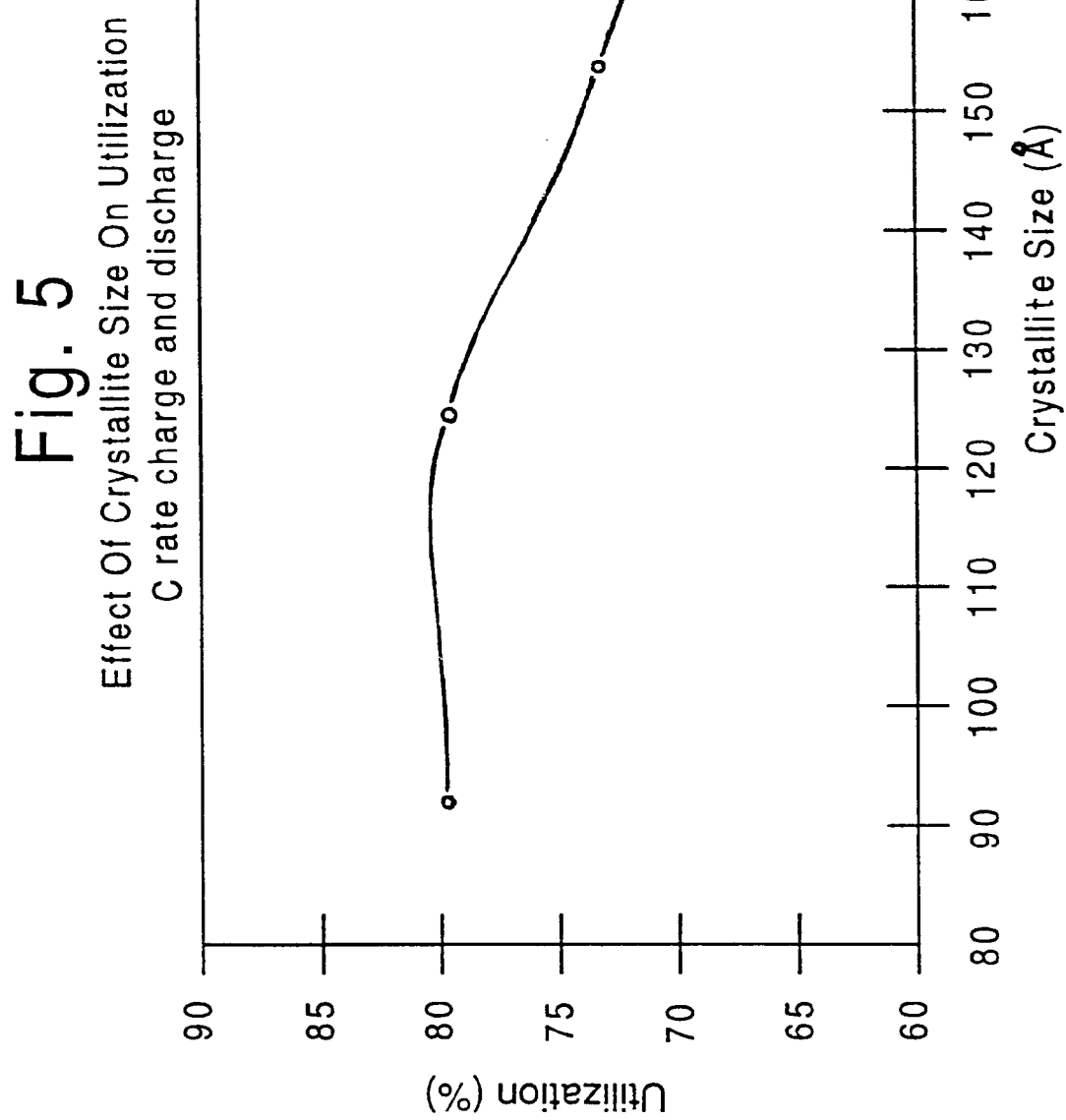

6,110,620

CONTROLLED CRYSTALLITE SIZE ELECTRODE

BACKGROUND OF THE INVENTION

Nickel-based electrodes are commonly used in rechargeable electrochemical cells. For example, nickel hydroxide particles, $Ni(OH)_2$, usually constitute the positive electrode in both nickel-cadmium ("nicad") and nickel-metal hydride cells. $Ni(OH)_2$ is the material of choice for positive electrodes in both types of cells because it can offer high energy density as well as good rate capability, desirable properties in today's battery market. High energy density is obtained through use of pasted electrodes in which a paste comprising high density spherical $Ni(OH)_2$ particles is applied to a foam substrate; high rate performance is typically obtained by using sintered $Ni(OH)_2$ electrodes.

However, in spite of these advantages of $Ni(OH)_2$, the changing structure of this material, in response to electrical charging and discharging, presents problems for designing a rechargeable cell having a commercially desirable life. The crystal structure of $Ni(OH)_2$ is characterized by a hexagonal unit cell with a layered structure comprising one nickel, two oxygen, and two hydrogen atoms per cell, as illustrated in FIG. 1. This "$\beta$-$Ni(OH)_2$" layered structure can also be described as a system of lamellar plates comprising an arrangement of nickel and oxygen atoms. When the typical $\beta$-$Ni(OH)_2$ electrode is charged, the positive electrode is oxidized and the Ni(II) of $\beta$-$Ni(OH)_2$ releases one electron to become Ni(III) and form beta nickel oxyhydroxide, $\beta$-NiOOH. In $\beta$-NiOOH, the lamellar plates of the crystal become slightly displaced away from each other, changing the volume of the unit cell. Upon discharge, the positive electrode is reduced, the Ni(III) of $\beta$-NiOOH accepting one electron to convert back to Ni(II) and form $\beta$-$Ni(OH)_2$, whereby the plates return to their initial positions.

At relatively higher discharge rates (e.g., 5–10 C), this reduction of Ni(III) to Ni(II) occurs more readily at the surfaces of the $Ni(OH)_2$ particles than within the bulk of these particles. This difference has a marked effect especially in high drain rate applications, such as power tools, where the net time allowed for discharge of the electrode is short. There, at least some of the Ni(III) situated within the bulk of the particles does not have sufficient time to become reduced back to Ni(II). As a result, these areas may begin the next charging cycle in the Ni(III) state, and so are subject to an even greater degree of oxidation. Thus, where the cycle of recharging and quick, high-rate discharging is repeated, these areas of Ni(III), i.e. $\beta$-NiOOH, typically begin converting to $\gamma$-NiOOH, a material comprising both Ni(III) and Ni(IV), e.g., in the form of species including nickelate, $(NiO_2)_3^-$, in which the nickel atoms have fractional formal valences such as $3\ ^2/_3$.

In forming $\gamma$-NiOOH, the lamellar plates of the crystal become significantly displaced away from each other, greatly expanding the crystal volume. FIG. 2 illustrates the differences in crystal structure among $\beta$-$Ni(OH)_2$, $\beta$-NiOOH, and $\gamma$-NiOOH. Upon discharge, $\gamma$-NiOOH converts back to $\beta$-$Ni(OH)_2$. This charge-discharge series thus creates an extreme expansion-contraction cycle which cracks the crystalline structure of the electrode particles so as to create many different particles thereby increasing the porosity of the electrode. Also, as this cracking process continues, many smaller particles are formed, causing the total particle surface area of the electrode to greatly increase. The greater surface area and increased porosity so produced result in migration of the electrolyte into the electrode and away from the cathode-anode separator so as to foster the formation of "dry" areas therein. These "dry" areas within the separator increase the internal resistance of the cell, thereby leading to generation of heat during charging and oxidation of the separator. Over the course of repeated charge-discharge cycles, these cracking, drying, and pressurizing processes degrade the positive electrode, causing cells to prematurely fail.

As a result, these processes are responsible for the "rainbow" shape of the typical graph of cell capacity versus charge-discharge cycle number in nickel electrode cells as illustrated in FIG. 3. Thus, a cell rated as having an initial capacity of, e.g., 1700mAH ("milliamp-hours")—based on a single-electron transfer—will, as $\gamma$-NiOOH accumulates, develop an increased capacity which may reach a maximum of, e.g., 2000 mAH or more. Then, once the amount of $\gamma$-NiOOH reaches a threshold level, the 2000 mAH capacity will decrease as premature degradation occurs, leading to cell failure. Such premature cell failure and variation in capacity are undesirable in the battery market.

In response to these problems, rechargeable battery makers regularly use $Ni(OH)_2$ which has been produced by co-precipitation with anti-$\gamma$ additives, such as cadmium compounds. The additives interfere with $\gamma$-NiOOH formation, apparently by occupying the spaces between lamellar plates of the $\beta$ crystal structures and interacting with the plates to largely inhibit their extensive displacement to the $\gamma$ structure.

However, this approach increases the materials input and cost of the electrode and fails to address the core problem of the difference in discharge rates of surface and subsurface nickel, thus limiting the degree of improvement in electrode charge-discharge efficiency which may be obtained thereby. Moreover, even with these additives, given sufficient overcharging, $\gamma$-NiOOH may to some degree still form within the electrode. Therefore, there is a need for an electrode which is more resistant to formation of and degradation by $\gamma$-NiOOH.

SUMMARY OF THE INVENTION

Accordingly, it is an object of the present invention to provide methods for producing nickel hydroxide battery electrodes which have 1) improved resistance to the formation of and degradation by $\gamma$-NiOOH, 2) improved cycle life, and 3) an improved charge-discharge efficiency. It is another object of this invention to provide methods for forming such electrodes which do not require a significant increase in materials input or cost.

The use of $Ni(OH)_2$ particles comprising a narrowly controlled range of small-sized crystallites of 60–160 Å average diameter, without significantly changing the size of the $Ni(OH)_2$ particles, has surprisingly been found to achieve the above objectives. Prior art electrodes have not taken advantage of this approach for obtaining electrodes having enhanced charge-discharge characteristics and offering improved cell life.

BRIEF DESCRIPTION OF THE DRAWINGS

FIG. 3 illustrates a graph of cell capacity versus charge/discharge cycle number for a cell with a typical, $\beta$-$Ni(OH)_2$ electrode.

FIG. 4 presents a plot of crystallite size of the $Ni(OH)_2$ positive electrode against electrochemical cleaning charge input to the electrode during production.

FIG. 5 shows a graph of percent utilization of the positive electrode against crystallite size of the $Ni(OH)_2$ electrode material.

DETAILED DESCRIPTION OF THE PREFERRED EMBODIMENTS

Figure 1:
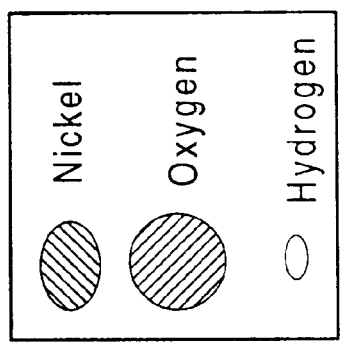
FIG. 1 illustrates the unit cell of a typical $\beta$-$Ni(OH)_2$ crystal, with its lamellar plate crystal structure.
Figure 1:
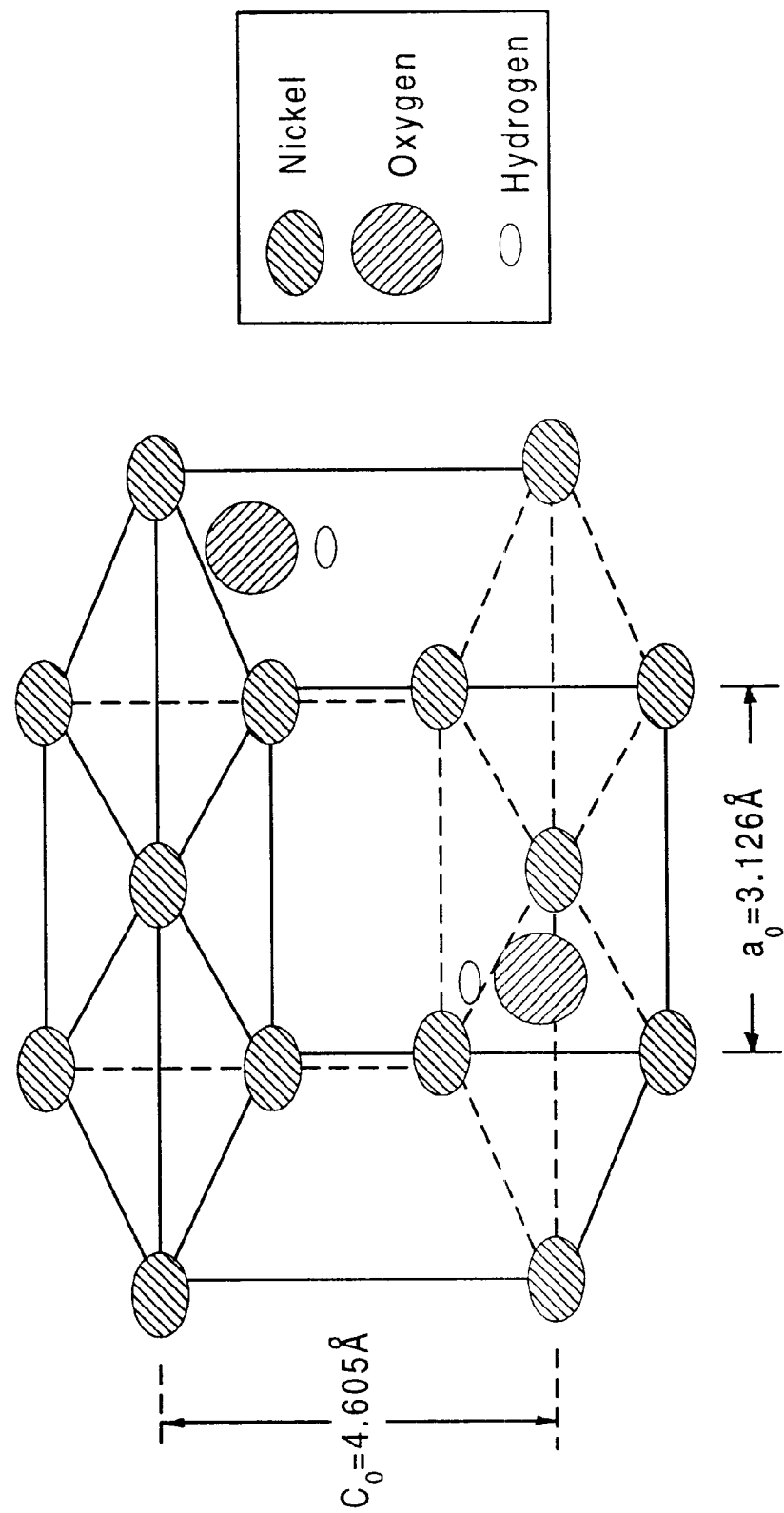
Figure 2:
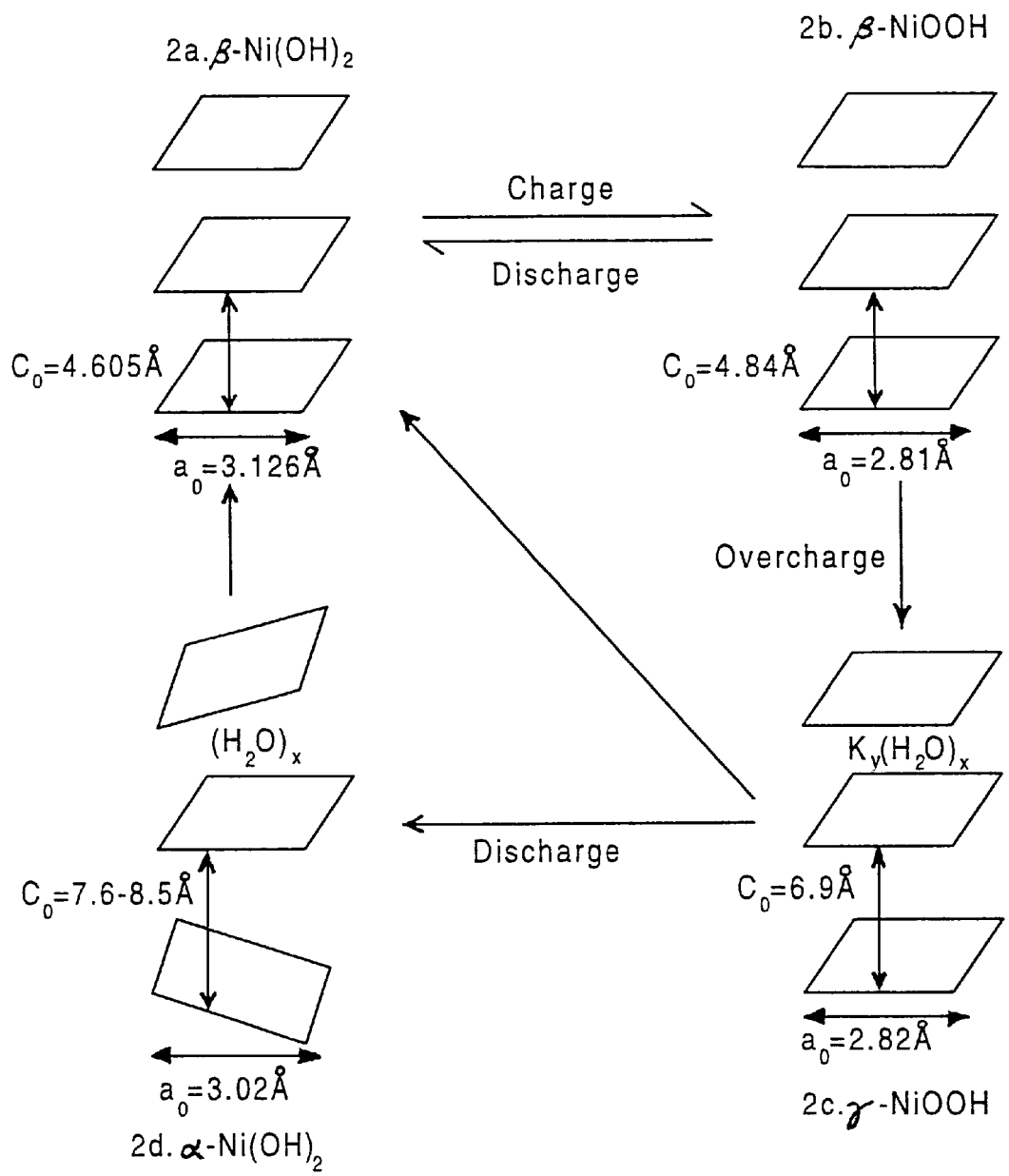
FIG. 2 is a Bode's Diagram illustrating the changes in crystal structure that occur as $\beta$-$Ni(OH)_2$ converts to $\beta$-NiOOH and as $\beta$-NiOOH converts to $\gamma$-NiOOH.

The electrode materials of the preferred embodiments comprise $Ni(OH)_2$ particles comprising a narrow range of small-sized crystallites which range in size from about 160 Å down to about 60 Å (the crystallite size being measured by X-ray diffraction). These small-crystallite-size particles may be produced in situ in the sintered electrode or may be produced in $Ni(OH)_2$ particles to be used in making pasted electrodes. Preferably, the crystallites will have an average size of about 80–130 Å, more preferably about 90–120 Å, and even more preferably about 100–110 Å.

A preferred method of making a pasted electrode comprises providing $Ni(OH)_2$ particles having crystallites which all fall within the size range of about 60–160 Å, forming a slurry of these particles along with a solvent, a viscosity increasing agent (such as a binder), and a conductor, and applying said slurry to a substrate. $Ni(OH)_2$ particles having a desired crystallite size range may be purchased from various metals manufacturers including Inco. Ltd. (Toronto, Ont., CAN), Tanaka Chem. Corp. (Osaka, JAP), H. C. Starck (Goslar, Del.), and Nichimen Corp. (Tokyo, JAP). The $Ni(OH)_2$ particles may also contain additives such as other metals and/or metal compounds such as cadmium, cobalt, copper, bismuth, indium, magnesium, manganese, vanadium, yttrium, or zinc metal(s) or compound(s), or nickel metal or other nickel compound(s), or mixtures of any of the aforementioned. When additives are used they are preferably zinc and/or cadmium metal(s). These and the other additives are preferably added as co-precipitates during formation of the $Ni(OH)_2$ particles, though other methods such as are known in the art may be used, alternatively or additionally, to treat the $Ni(OH)_2$ particles after their formation so as to combine the additives with the particles, e.g., to produce absorption of the additive(s) into the particles, adsorption or coating of the additive(s) onto the particles, and so forth. Preferably, the $Ni(OH)_2$ particles are approximately spherical in shape, i.e. their outer surfaces approximate spheres, spheroids, or ellipsoids.

A preferred slurry comprises the approximately spherical $Ni(OH)_2$ particles in an aqueous mixture comprising water as the solvent, a hydrophilic binder, and a conductor. The hydrophilic binder will preferably comprise any hydrophilic polymer(s), preferred examples of which include methyl cellulose, hydroxymethyl cellulose, carboxymethyl cellulose, and mixtures thereof. The conductor is preferably one of the metals and/or metal compounds (or mixtures thereof) mentioned above as useful additives to the $Ni(OH)_2$ particles. A preferred conductor is CoO. The resulting slurry is then applied to a conductive metal substrate and the loaded substrate is dried. A preferred substrate is a nickel foam substrate whose surface has a sponge-like structure, such as is obtained by sintering a mat of nickel fibers.

One preferred method by which the controlled-crystallite size $Ni(OH)_2$ particles may be formed has unexpectedly been found to involve treating the $Ni(OH)_2$ particles with defined sequences of electrical charging steps. When used in the production of a sintered electrode, a preferred embodiment of this process comprises performing such a defined sequence of electrical charging steps upon the $Ni(OH)_2$ particles after they have been loaded onto a sintered plaque substrate: i.e. after the substrate has undergone the loading-conversion process used to impregnate it with nickel hydroxide, one or more electrical charges is applied to it while it is undergoing an electrochemical cleaning process. This process produces crystallites of 60–160 Å in situ in the $Ni(OH)_2$ particles making up the electrode.

The typical production of a sintered nickel electrode comprises providing a conductive metal sintered plaque substrate, putting the substrate through at least one impregnation-cleaning series—i.e. impregnating the substrate with $Ni(OH)_2$ by means of a loading-conversion cycle and then electrochemically cleaning the impregnated substrate—and incorporating it, as a positive electrode, into a cell. Preferably, at least about two cycles of impregnation are employed, more preferably a total of about three to about ten cycles, and yet more preferably about five to about seven cycles. Each impregnation cycle comprises at least two steps.

In a first step, the substrate is loaded by dipping in an acidic solution—i.e. solution or suspension—comprising a nickel salt, preferably $Ni(NO_3)_2$; this solution may also comprise one or more other metal compounds, such as cadmium compounds, cobalt compounds, copper compounds, bismuth compounds, indium compounds, magnesium compounds, manganese compounds, vanadium compounds, yttrium compounds, zinc compounds, or other nickel compounds, e.g., metal nitrates such as $Cd(NO_3)_2$ and/or $Co(NO_3)_2$. The acidic nature of the solution is due to the presence of an acid. Any acid may be employed, though sulfuric, acetic, and/or nitric acid are preferred. More preferred is nitric acid. In a second step, performed after the loading step, the substrate-born $Ni(NO_3)_2$ is converted to $Ni(OH)_2$ by dipping in a caustic solution preferably comprising NaOH, though, e.g., KOH and/or LiOH, or mixtures thereof with NaOH may be used instead. These two steps are not exclusive of others, as one or more of the impregnation cycles may also comprise further steps wherein, e.g., other metal(s) or metal compound(s) are incorporated into or upon the surface of the $Ni(OH)_2$.

After at least 1 impregnation cycle has been completed, the $Ni(OH)_2$-impregnated substrate is electrochemically cleaned in a solution comprising, preferably, NaOH, though, e.g., KOH and/or LiOH, or mixtures thereof with NaOH may be used instead. While the impregnated plaque is immersed in this solution, a charge is applied thereto—typically about 60% of capacity, as based on a single-electron exchange, given the mass of $Ni(OH)_2$ thereon, i.e. 60% of "single electron capacity." After cleaning, the impregnated substrate is incorporated into a cell as its positive electrode, according to any procedures such as are known in the art.

According to a preferred embodiment of the present invention, after at least about two of such impregnation cycles has been performed, the $Ni(OH)_2$-impregnated substrate undergoes an electrochemical cleaning step in which an overcharge, i.e. a charge in excess of 100% of single electron capacity, is applied thereto. Preferably a charge of at least about 120% of single electron capacity is utilized, more preferably at least about 135%, even more preferably, at least about 140%, and still more preferably, at least about 150%. The overcharge may exceed 300% of single electron capacity, but should not be so large that crystallites below about 60 Å in size form within the $Ni(OH)_2$ particles. The overcharge level at which this occurs may be empirically determined for a given $Ni(OH)_2$/additive/substrate combination by applying various overcharges to electrode samples comprising the combination and then measuring the resulting crystallites by such methods as are known in the art, including X-ray diffraction of the $Ni(OH)_2$ or $Ni(OH)_2$/additive particles.

Preferably, at least two electrochemical cleanings are utilized, each performed after a different round of impregnation. More preferably at least one of said electrochemical cleanings takes place after all impregnation cycles have been completed. In a preferred embodiment, one electrochemical cleaning is performed after an initial three rounds of impregnation and a second is performed after a final three rounds of impregnation. Example 1.

Sintered $Ni(OH)_2$ positive electrodes were produced by providing a sintered substrate, passing it through three cycles of impregnation—each cycle comprising loading the substrate with $Ni(NO_3)_2$ and then performing conversion at 65° C. in a solution of NaOH—electrochemically cleaning it while inputting one of various charge levels, passing it through another three cycles of impregnation, and once more electrochemically cleaning it while inputting the same degree of charge. The charge input levels were varied among electrodes, ranging from 0% to 150% of single electron capacity. The crystallite size of the resulting electrodes was measured by scanning electron micrography and X-ray diffraction. The crystallite size in uncharged electrodes was found to be about 170 Å. Crystallite size was plotted against percent charge input, as shown in FIG. 4 (Effect of Charge Input on Crystallite Size).

A second batch of test and uncharged electrodes was made according to the same procedures as above. These test and control electrodes were then incorporated into sub-C-size sinter/sinter nickel-cadmium cells and charged and discharged at C-rate. Their discharge outputs were recorded and the percent utilization of the positive electrode was calculated therefrom. Percent utilization was then plotted against nickel positive electrode crystallite size as shown in FIG. 5 (Effect of Crystallite Size on Utilization).

These results show that percent utilization of the positive electrode increases significantly when the $Ni(OH)_2$ particles thereof have controlled crystallite sizes of 160 Å or less. In fact, percent utilization increases from about 65% to about 80% when the crystallite size thereof—falling within the 60–160 Å range—is an average of about 120 Å, as, e.g., when a charge input of at least about 140% is applied to the impregnated sinter during electrochemical cleaning.

Though not wishing to be bound to any particular theory, it is believed that the improvements provided by the use of 60–160 Å controlled crystallite size $Ni(OH)_2$ particles in sintered and/or pasted electrodes operate as follows. The small crystallite size of the $Ni(OH)_2$ particles appears to: 1) increase particle porosity, thereby possibly allowing increased intraparticle electrolyte irrigation of the bulk nickel; and 2) increase the internal surface area of the electrode so as to provide more reaction sites for reduction of electrode nickel atoms upon discharge. This may increase the effective charge-discharge rate of the slowest charging/discharging, i.e. bulk, nickel atoms. In combination with this increase in bulk nickel atom discharge rate, the increased uniformity of crystallite size (provided by the use of a controlled range of crystallite sizes), appears to significantly narrow the disparity in charge-discharge rates of bulk and surface nickel populations, while at the same time increasing the overall efficiency of electrode charge-discharge and the effective percent utilization thereof. It appears that, because the bulk discharge rate is improved, the risk of extreme oxidation of undischarged areas may be lessened, possibly accounting for the electrode's greater resistance to γ-NiOOH formation. It may also be that, by producing a cell in which the positive electrode material begins as small crystallite particles, sufficient electrolyte may be present from the start to possibly inhibit the formation of "dry" areas in the electrode were some γ-NiOOH to form in the cell later on. Also, the increased utilization of the electrode eliminates the accumulation of γ-NiOOH and thus the undesirable premature cell failure of FIG. 3. These beneficial effects may account for the longer cycle life of cells with the controlled crystallite size nickel positive electrodes of the present invention.

Variations of the methods described herein as the preferred embodiments may be apparent to those skilled in the art once they have studied the above description. Variations such as these are considered to be within the scope of the invention, which is intended to be limited only to the scope of the claims and the reasonably equivalent materials and methods to those defined therein. The foregoing examples illustrate a preferred embodiment of the invention. Various changes can be made without departing from the invention as defined in the appended claims, which are to be interpreted in accordance with the principle of patent law including the Doctrine of Equivalents.

The embodiments of the invention in which an exclusive property or privilege is claimed are defined as follows:

1. A sintered electrode comprising $Ni(OH)_2$ particles in which all crystallites thereof fall within a size range of about 60 Å to about 160 Å.

2. The electrode of claim 1 wherein said crystallites have an average size of about 80 Å to about 130 Å.

3. The electrode of claim 2 wherein said crystallites have an average size of about 90 Å to about 120 Å.

4. The electrode of claim 3 wherein said crystallites have an average size of about 100 Å to about 110 Å.

5. A method for producing a controlled crystallite size nickel hydroxide sintered electrode, having $Ni(OH)_2$ particles in which all crystallites thereof fall within a 60–160 Å size range, comprising the steps of:

providing a conductive metal sintered plaque substrate; and putting said substrate through at least one impregnation-cleaning series, said impregnation-cleaning series comprising the substeps of:
  a) impregnating said substrate with nickel hydroxide by putting said substrate through one or more impregnation cycles to form an impregnated substrate; and
  b) electrochemically cleaning said impregnated substrate at least once, said substep of electrochemically cleaning said impregnated substrate comprising the sub-substeps of:
    i) immersing said impregnated substrate into a solution of at least one caustic base, and
    ii) applying a charge to said impregnated substrate, said charge being equivalent to at least about 120% of single-electron capacity, but less than that producing crystallites less than about 60 Å in size.

6. The method according to claim 5 wherein said method further comprises repeating said substep of impregnating said substrate, after said step of putting said substrate through at least one impregnation-cleaning series.

7. The method according to claim 5 wherein a total of two impregnation-cleaning series are performed, said substep of impregnating said substrate comprising two to five impregnation cycles.

8. The method according to claim 7 wherein said substep of impregnating said substrate comprises 3 impregnation cycles.

9. The method according to claim 5 further comprising a step comprising incorporating said impregnated substrate as a positive electrode into an electrochemical cell, after said step of putting said substrate through at least one impregnation-cleaning series.

10. The method according to claim 5 wherein said charge is equivalent to at least about 135% of the single electron capacity of said impregnated substrate.

11. The method according to claim 9 wherein said charge is equivalent to at least about 140% of the single electron capacity of said impregnated substrate.

12. The method according to claim 9 wherein said charge is equivalent to at least about 150% of the single electron capacity of said impregnated substrate.

13. The method according to claim 5 wherein said caustic base is selected from the group consisting of metal hydroxides and mixtures thereof.

14. The method according to claim 13 wherein said caustic base is selected from the group consisting of alkali metal hydroxides, alkaline earth metal hydroxides, and mixtures thereof.

15. The method according to claim 14 wherein said caustic base is selected from the group consisting of NaOH, KOH, LiOH, and mixtures thereof.

16. The method according to claim 5 wherein said impregnation cycle comprises:
 a first sub-substep comprising loading said substrate with at least one nickel compound to form a loaded substrate; and
 a second sub-substep comprising converting said nickel compound to nickel hydroxide by immersing said loaded substrate into a solution of at least one caustic base.

17. The method according to claim 16 wherein said loading comprises immersing said substrate in an acidic solution comprising at least one nickel compound.

18. The method according to claim 17 wherein said at least one nickel compound is nickel nitrate.

19. The method according to claim 17 wherein said solution further comprises at least one other metal compound.

20. The method according to claim 19 wherein said at least one other metal compound is selected from the group consisting of cadmium compounds, calcium compounds, cobalt compounds, copper compounds, bismuth compounds, indium compounds, magnesium compounds, manganese compounds, vanadium compounds, yttrium compounds, zinc compounds, non-Ni(OH)$_2$ nickel compounds, and mixtures thereof.

21. The method according to claim 19 wherein said at least one other metal is selected from the group consisting of metal nitrates and mixtures thereof.

22. The electrode produced according to the method of claim 5.

23. The electrode produced according to the method of claim 7.

24. The electrode produced according to the method of claim 12.

25. The electrode produced according to the method of claim 16.

26. The electrode produced according to the method of claim 19.

27. A cell comprising the electrode of claim 1.

28. A cell comprising the electrode of claim 4.

29. The cell produced according to the method of claim 9.

30. A cell comprising the electrode of claim 22.

31. A cell comprising the electrode of claim 23.

32. A cell comprising the electrode of claim 24.

33. A cell comprising the electrode of claim 25.

34. A cell comprising the electrode of claim 26.

* * * * *